United States Patent [19]

Fitzgibbon

[11] Patent Number: 4,658,899
[45] Date of Patent: Apr. 21, 1987

[54] USE OF UNCALCINED/PARTIALLY CALCINED INGREDIENTS IN THE MANUFACTURE OF SINTERED PELLETS USEFUL FOR GAS AND OIL WELL PROPPANTS

[75] Inventor: Jeremiah J. Fitzgibbon, Lafayette, La.

[73] Assignee: Standard Oil Proppants Company, L.P., Irving, Tex.

[21] Appl. No.: 707,776

[22] Filed: Apr. 22, 1985

Related U.S. Application Data

[60] Division of Ser. No. 538,058, Sep. 30, 1983, Pat. No. 4,623,630, which is a continuation-in-part of Ser. No. 405,055, Aug. 4, 1982, Pat. No. 4,427,068, which is a continuation-in-part of Ser. No. 347,210, Feb. 9, 1982, abandoned.

[51] Int. Cl.$^4$ ............................................. E21B 43/267
[52] U.S. Cl. ...................................... 166/280; 501/127
[58] Field of Search ................ 166/280, 308; 264/117; 501/127, 128

[56] References Cited

U.S. PATENT DOCUMENTS

| 3,758,318 | 9/1973 | Farris et al. | 501/128 |
| 3,976,138 | 8/1976 | Colpoys, Jr. et al. | 166/280 |
| 4,068,718 | 1/1978 | Cooke, Jr. et al. | 166/280 |
| 4,522,731 | 1/1985 | Lunghofer | 166/280 X |

FOREIGN PATENT DOCUMENTS 2037727 7/1980 United Kingdom ................ 166/280

OTHER PUBLICATIONS

"Light Weight Proppants for Deep Gas Well Stimulation", 2nd Annual Report, Jul. 1, 1980–Jun. 30, 1981, published Apr. 1982, DOE Contract AC1-9-79BC10038, by R. A. Cutler et al, Terra Tek, Inc.
"Light Weight Proppants for Deep Gas Well Stimulation", Final Report, Dec. 1983, DOE Contract AC-1-9-79BC10038, by R. A. Cutler et al, Terra Tek Engineering.
Letter: 10/17/85, to J. Orsini from D. Wirth, Coors Porcelain Co.
Letter: 8/24/78, to B. Poplin from D. Golden, Coors Porcelain Co.
Coors Porcelain Company, High-Strength Proppant Proposal, presented to Haliburton Services, 8/9/78.

Primary Examiner—George A. Suchfield
Attorney, Agent, or Firm—Pravel, Gambrell, Hewitt & Kimball

[57] ABSTRACT

A composite, sintered, spherical pellet and a method for its manufacture are described. The pellet is prepared from at least one uncalcined or partially calcined ingredient selected from the group consisting of clay and bauxite materials, dust collector fines and alumina. The pellet may have an alumina-to-silica ratio from about 9:1 to about 1:1. The pellet has a specific gravity of less than 3.40. Use of such pellets in propping hydraulically fractured subterranean formations is also described.

11 Claims, No Drawings

USE OF UNCALCINED/PARTIALLY CALCINED INGREDIENTS IN THE MANUFACTURE OF SINTERED PELLETS USEFUL FOR GAS AND OIL WELL PROPPANTS

This is a division of Ser. No. 538,058, filed Sept. 30, 1983, now U.S. Pat. No. 4,623,630 which is a continuation-in-part of Ser. No. 405,055, filed Aug. 4, 1982, now U.S. Pat. No. 4,427,068, which is a continuation-in-part of Ser. No. 347,210, filed Feb. 9, 1982, now abandoned.

BACKGROUND OF THE INVENTION

1. Field of the Invention

The present invention relates to oil and gas well proppants and, more particularly, to sintered proppants made from ingredients at least some of which are uncalcined or partially calcined, a method of making such proppants, and to a method of maintaining a fracture in a subterranean formation in a propped condition by utilizing such proppants.

2. History of the Prior Art

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic pellets, which are carried into the fracture by means of a fluid.

Spherical pellets of uniform size are believed to be the most effective proppants due to maximized permeability. For this reason, assuming other properties to be equal, spherical or essentially spherical proppants, such as rounded sand grains, metallic shot, glass beads and tabular alumina, are preferred.

In practice, in deep wells, where high pressures are encountered, e.g., above about 700 kg/cm$^2$ (10,000 psi), the immediately foregoing specifically mentioned proppants are either entirely ineffective or do not exhibit desired permeability. Examples of prior art proppants and their use are found in U.S. Pat. Nos. 2,950,247, McGuire, et al; 3,026,938 Huitt, et al; 3,126,056, Harrell; 3,497,008, Graham, et al; 3,976,138, Colpoys, et al; and 4,068,718, Cooke, et al. One of the better proppants useful at high pressures, disclosed in U.S. Pat. No. 3,976,138, is predominantly alumina. However, even such alumina, as disclosed in U.S. Pat. No. 3,976,138, has reduced permeability at pressures in excess of 350 Kg/cm$^2$ (5,000 psi).

As disclosed in U.S. Pat. No. 4,068,718, sintered bauxite made from calcined bauxite unexpectedly has a permeability which is superior to the previously mentioned proppant materials at pressures as high as 700 kg/cm$^2$ (10,000 psi) or higher. Pellets having a high apparent specific gravity, i.e. greater than 3.4, are disclosed in U.S. Pat. No. 4,068,718 to be most suitable as proppant materials.

The prior art sintered bauxite particles made from calcined bauxite may be produced in spherical shape as described in R. J. Seider's commonly assigned, copending U.S. patent application Ser. No. 252,491, filed Apr. 8, 1981, as a continuation of U.S. patent application Ser. No. 969,122, filed Dec. 13, 1978. Such prior art sintered bauxite proppants prepared from fully calcined bauxite, although extremely useful under high pressure conditions, over about 700 kg/cm$^2$ (10,000 psi), are costly. The cost of the prior art high strength, sintered, calcined bauxite proppant for wells of intermediate pressures, between about 350 and 700 kg/cm$^2$ (5,000 and about 10,000 psi), may not be economically justified.

The manufacture of sintered spherical pellets from calcined clay and calcined bauxite, calcined alumina or mixtures thereof, is described in J. F. Fitzgibbon's commonly assigned, copending U.S. patent applications, Ser. Nos. 347,210 filed Feb. 9, 1982, and 405,055 filed Aug. 4, 1982. These pellets are available at somewhat lower cost and are aptly suited to use under pressures of up to about 700 Kg/cm$^2$ (10,000 psi). These pellets have lower specific gravities and bulk densities than those made according to U.S. Pat. No. 4,068,718.

Calcining adds considerably to the cost of the raw materials or ingredients used in the manufacture of pellets useful as proppant. For example, the cost of dried diaspore clay is about 35 dollars per ton, if air dried. The cost of the same material is about 70 dollars per ton, if fully calcined.

While the prior art ceramic pellets made from fully calcined ingredients are aply suited for many proppant applications there remains a need to provide strong ceramic pellets that are of even lower cost.

The present invention provides strong pellets aptly suited to use as proppants under pressures of up to about 700 kg/cm$^2$ (10,000 psi), which are more economical than previously available synthetic ceramic proppants and have low specific gravities and bulk densities, which benefit the user, in that fewer pounds of proppant per cubic foot of fracture are required. Handling, e.g., pumping of slurries of low density material, is easier than handling of high density materials.

BRIEF DESCRIPTION OF THE INVENTION

In accord with the present invention, composite, spherical pellets or particles containing one or more uncalcined or partially calcined ingredients as a component and having an alumina-to-silica dry weight basis ratio of from about 9:1 to about 1:1 and apparent specific gravities less than 3.30, are produced. Diaspore clay, burley clay and flint clay have been found to be useful in the manufacture of such pellets although it is believed that other clays may be employed. Surinam and Comalco bauxites have been found to be useful although it is believed that other bauxites may be employed. Such spherical particles having an alumina to silica dry weight basis ratio of from about 9:1 to 1:1 and an apparent specific gravity of at least about 2.6 are useful as oil and gas well proppants.

The present uncalcined or partially calcined materials which are particularly adapted to use in combination with known, prior art proppant materials include fines from the dust collection systems of clay calcining kilns, and uncalcined or partially calcined clays and uncalcined or partially calcined bauxites. These uncalcined or partially calcined materials are blended with fully calcined clays and fully calcined bauxites or alumina to produce composite sinterable, spherical pellets which are subsequently furnaced to produce sintered, spherical pellets eminently useful as proppants. The composites of the present invention may be made from a significant portion and may even be made from a major portion of an uncalcined or partially calcined ingredient or ingredients. Composites of the present invention may be made from a very small amount of uncalcined or partially calcined ingredients but preferably are made from at least about five (5) percent by weight of uncalcined or partially calcined ingredients.

The partially calcined and uncalcined clay and bauxite materials of the present invention are compatible with, and may be formed into a matrix with, a wide variety of proppant materials, and, in this manner, a wide variety of composite proppants may be produced, which may be customized to particular conditions or formations. Thus, the properties of the final sintered composite pellets, such as strength, permeability, specific gravity, bulk density and acid resistance, may be controlled through variations in the initial component mixture.

Combinations of dust collector fines, diaspore clay and bauxite are particularly useful. Such mixtures may suitably contain up to 70 percent by weight uncalcined clay. Mixtures containing up to 50 percent by weight uncalcined clay have a broad range of use, and mixtures containing up to 40 percent by weight uncalcined clay have a particularly broad range of use.

The present invention also provides a process for propping fractures in oil and gas wells at depths of 6,000 to 14,000 feet utilizing the present sintered pellets by mixing the pellets with a fluid, such as oil or water, and introducing the mixture into a fracture in a subterranean formation. The compaction pressure upon the fracture generally is at least 280 kg/cm$^2$ (4,000 psi) and usually is in the range of from about 350 to about 700 kg/cm$^2$ (5,000 to about 10,000 psi). The present pellets have an average particle size between 0.1 and 2.5 millimeters. It has been found that the present composite pellets containing 50 percent or more parts by weight uncalcined clay, at pressures up to about 700 kg/cm$^2$ (10,000 psi), have desirable permeability characteristics, i.e., they exhibit a permeability to brine at about 93.3° C. (200° F.) which decreases not more than about three-fourths when the pressure applied to them is increased from 140 to 700 kg/cm$^2$ (2,000 to 10,000 psi).

The present proppant materials are produced by forming a mixture comprised of dried but uncalcined or only partially calcined clays and bauxites and dust collector fines with fully calcined materials. The starting ingredients have an average particle size of less than about 15 microns and, preferably, less than about 10 microns and, most prefereably, less than about 5 microns.

In a preferred method, the mixture is produced on an intensive mixer having a rotatable table provided with a rotatable impacting impeller, such as described in U.S. Pat. No. 3,690,622, to Brunner. Sufficient water is added to cause essentially spherical ceramic pellets to form, and, after such pellets have formed, from about 5 to about 15 percent of additional ceramic powder by weight of pellets is added, and the mixer is further operated to cause accretion of the added material to the pellets being formed.

The resulting pellets are then dried to a moisture content of less than ten (10) weight percent, usually at between about 100 and about 300 degrees centigrade, and thereafter furnaced at sintering temperature until an apparent specific gravity between about 2.60 and about 3.30 is obtained, depending on the composition of the starting mixture.

DETAILED DESCRIPTION OF THE INVENTION

The sintered composite proppant pellets of the present invention have apparent specific gravities less than 3.30. Preferably they spherical in shape.

The sphericity of the pellets may be determined using a visual comparator. Krumbein and Sloss, *Stratigraphy and Sedimentation,* second edition, 1955, W. H. Freeman a Co., San Francisco, CA, describe a chart for use in visual determination of sphericity and roundness. Visual comparison using this chart is a widely used method of evaluating sphericity or roundness of particles. In using the visual comparison method, a random sample of 10 to 20 particles of the material to be tested is selected. The particles are viewed under a 10 to 20 power microscope or a photomicrograph and their shapes compared to the Krumbein and Sloss chart. The chart values for sphericity range from 0.3 to 0.9. The chart values for the individual particles are then averaged to obtain a sphericity value. The present particles have an average sphericity of about 0.7 or greater when visually compared with the Krumbein and Sloss chart.

"Spherical" and related forms, as used herein, is intended to mean an average ratio of minimum diameter to maximum diameter of about 0.70 or greater, or having an average sphericity value of about 0.7 or greater compared to a Krumbein and Sloss chart.

"Bulk density", as used herein, is the weight per unit volume, including in the volume considered, the void spaces between the particles.

"Apparent specific gravity" is a number without units, but numerically equal to the weight in grams per cubic centimeter of volume, excluding void space or open porosity in determining the volume. The apparent specific gravity values given herein were determined by liquid (ethylbenzene) displacement.

"Theoretical density" and "true specific gravity" exclude not only the void space between particles and open porosity of particles from the volume, but also exclude closed porosity. These latter two measures are not customarily used for characterizing proppants. Theoretical density and true specific gravity require fine grinding to expose any closed porosity.

"Calcined" as used herein, refers to a process to which a material has been subjected. Ore materials that have been fully subjected to calcination or a calcining process exhibit very low Loss on Ignition (LOI) and moisture contents, e.g. about 1–2 percent by weight or less. Uncalcined ore materials such as bauxites and clays can contain from about 10 to about 40 percent by weight volatiles. "Partially calcined" materials such as diaspore clay calcination kiln dust collection system fines typically exhibit total volatiles (LOI plus moisture content) of 5 to 8 percent by weight. Volatiles can include moisture, organics and chemically held water (e.g. water of hydration).

"Dust collector fines" as used herein refers to material obtained from the dust collection system of a calcining kiln operating on a clay or bauxitic ore. Such fines are usually partially calcined and exhibit a higher silica ($SiO_2$) content than the ore being processed in the kiln.

Unless otherwise stated at the point of interest, all percentages, proportions and values with respect to composition are expressed in terms of weight.

The sintered, spherical pellets of the present invention may be manufactured by furnacing a mixture of calcined and partially calcined or uncalcined ingredients. While various sintering aids, such as of bentonite clay or iron oxide, boron, boron carbide, aluminum diboride, boron nitride, boron phosphide and other boron compounds, and fluxes, such as sodium carbonate, lithium carbonate, feldspar, manganese oxide, titania, iron oxide and sodium silicates, may be added in amounts up to about ten (10) weight percent to aid sintering, such additions are generally unnecessary because the use of partially or totally uncalcined ingredients promotes sintering at lower temperatures than those necessary to obtain finished pellets having comparable properties when using only fully calcined ingredients. If desired, a binder, for example, various resins or waxes known in the prior art, may be added to the initial mixture to improve pelletizing and to increase the green strength of the unsintered pellets.

Pellets according to the present invention and for use with the present invention may be prepared from a mixture of any of the clays described in Tables I and II with one or more bauxites or alumina or mixtures of these. The composition of specific bauxites employed in the manufacture of the pellets described herein is also given in Tables I and II. All values in Tables I and II are expressed as percentages by weight. Where an omission occurs, it indicates that sufficient testing was not conducted to obtain a value.

The Surinam bauxite described in Table I may be obtained from Aluminum Company of America, Pittsburgh, Penna. 15219. Surinam bauxite is so designated for that is the country in which it is mined. It is expected that other bauxites may be used without departing from the present invention.

Diaspore clays, as found in nature, are predominantly hydrated aluminum oxide ($Al_2O_3 \cdot H_2O$). Such clays occur in emery rock in association with corundum. The main deposits of diaspore clays in the United States are in Missouri and Pennsylvania. Diaspore clays have a hardness between 6.5 and 7.0 and a true specific gravity usually between 3.30 and 3.45 $gm/cm^3$. The crystal structure of diaspore clay is orthorhombic. Typically, diaspore clay, as found in nature, contains 25 to 30 percent by weight, and, in some cases, as high as 35 percent by weight, of impurities. Generally, the major impurities are: $SiO_2$, which typically ranges from about 12 to about 25 percent by weight; $TiO_2$, which typically ranges from about 2.75 to 3.75 percent; F typically between 0.25 and 1.0 percent; and MgO and CaO, generally less than 1.0 percent.

Dust collector fines sample 4 was generated while calcining diaspore clay. The materials which were being calcined during generation of dust collector fines samples 1-3 are not known.

The uncalcined clay and bauxitic materials for use in the present invention are usually air dried at low temperature, e.g. 90°–150° C. (200°–300° F.) prior to use with other calcined ingredients. Air drying removes free moisture; that is, moisture that is not chemically combined. The calcined ingredients are initially cal-

TABLE I

| | | | (Typical Analysis of Ingredients) | | | (Dust Collector Fines) | | | |
|---|---|---|---|---|---|---|---|---|---|
| | Surinam Bauxite | Control Batch | Uncalcined Clay (16 Mesh and Finer) | Uncalcined Clay (1982 Stockpile) | Uncalcined Clay (Stockpile #1) | Samp. 1 | Samp. 2 | Samp. 3 | Samp. 4 |
| $H_2O$ | 0.57 | .611 | 0.88 | 0.88 | 0.81 | — | — | — | 1.51 |
| LOI | 1.23 | 1.26 | 11.12 | 11.12 | 12.75 | 6.20 | 6.27 | 6.07 | 6.51 |
| $Al_2O_3$ | 86.96 | 71.6 | 51.84 | 51.84 | 58.53 | 45.52 | 45.44 | 47.33 | 58.41 |
| $SiO_2$ | 2.51 | 16.929 | 37.87 | 37.87 | 29.53 | 41.00 | 41.08 | 39.76 | 26.18 |
| $Fe_2O_3$ | 5.95 | 4.84 | 1.04 | 1.04 | 1.00 | 2.30 | 2.29 | 2.49 | 3.34 |
| $TiO_2$ | 3.35 | 3.06 | 2.65 | 2.65 | 3.09 | 4.08 | 4.06 | 4.28 | 4.05 |
| $Na_2O$ | — | 1.32 | .021 | .021 | .009 | 1.41 | 1.37 | 1.91 | — |
| $K_2O$ | — | .94 | 4.25 | 4.25 | 2.82 | 0.055 | 0.017 | 0.049 | — |
| CaO | — | .08 | 0.14 | 0.14 | 0.15 | 1.42 | 1.42 | 1.30 | — |

TABLE II

| | (Typical Analysis of Ingredients - calcined) | | | | | |
|---|---|---|---|---|---|---|
| Chemical Compound | Surinam Bauxite | High Purity Disapore Clay | High Silica Disapore Clay | High Iron (Brown) Disapore Clay | Burley Clay | Flint Clay |
| $Al_2O_3$ | 86.80 | 75.10 | 70.00 | 78.30 | 54.07 | 38.52 |
| $SiO_2$ | 3.42 | 18.60 | 24.40 | 15.09 | 41.33 | 56.64 |
| $Fe_2O_3$ | 4.74 | 0.80 | 0.80 | 2.63 | 1.26 | 0.65 |
| $TiO_2$ | 3.13 | 2.99 | 3.04 | 3.05 | 2.45 | 3.49 |
| Other (e.g. MgO, CaO) | 1.00 | 1.51 | — | 0.72 | 0.74 | 0.67 |
| Loss on Ignition | 0.91 | 1.00 | — | 0.21 | 0.15 | 0.03 |
| Moisture Apparent Specific Gravity After Calcining g/cc | 3.6-3.7 2.5-2.6 | 2.9-3.1 | 2.9-3 | 2.9-3.1 | 2.7-2.8 | |

Each of the clays and dust collector fines described in Tables I and II may be obtained from Missouri Minerals Processing, High Hill, Mi. 63350, in raw or calcined form.

cined, by known prior art methods, at temperatures and times sufficiently high, typically 1000°–1200° C., to remove any organic material and to remove most or all water of hydration. Water of hydration is chemically combined water. Calcined and partially calcined materials may be used without further treatment unless they have been stored in a manner that permits pickup of free moisture, in which circumstance they should be dried in air or at low temperature prior to use. Free water or moisture is not chemically combined. Excess free moisture may cause agglomeration and caking during ball milling of the ingredients. Ball milling is normally employed to reduce the particle size of the ceramic ingredients the desired small size.

The sintered pellets of the present invention are preferably made as follows:

1. Starting ingredients of uncalcined or partially calcined clay and calcined clay and uncalcined or partially calcined bauxite and calcined bauxite or alumina, or mixtures thereof, are added in a predetermined ratio to a high intensity mixer. The ratio of ingredients is chosen based on analysis of the ingredients and desired analysis and specific gravity of the pellets to be produced. Preferably, at least five (5) percent of the total ingredients on a dry weight basis is uncalcined or partially calcined material. Each of the ceramic ingredients has an average particle size of less than about 15 microns and preferably less than about 10 microns and most preferably, less than about 5 microns.

Small particle size is required in order to obtain a finished spherical sintered pellet having the desired density. An average particle size of smaller than 5 microns is desirable, and the average particle size is most preferably below 3 microns and usually above 0.5 microns.

2. The powdered ceramic starting ingredients are stirred to form a dry homogeneous particulate mixture having an average particle size of less than about 15 microns.

A preferred stirring or mixing device is that obtainable from Eirich Machines, Inc., known as the Eirich Mixer. A mixer of this type is provided with a horizontal or inclined circular table, which can be made to rotate at a speed of from about 10 to about 60 revolutions per minute (rpm), and is provided with a rotatable impacting impeller, which can be made to rotate at a tip speed of from about 5 to about 50 meters per second. The direction of rotation of the table is opposite that of the impeller, causing material added to the mixer to flow over itself in countercurrent manner. The central axis of the impacting impeller is generally located within the mixer at a position off center from the central axis of the rotatable table. The table may be in a horizontal or inclined position, wherein the incline, if any, is between 0 and 35 degrees from the horizontal.

3. While the mixture is being stirred, there is added sufficient water to cause formation of composite, spherical pellets from the ceramic powder mixture.

In general, the total quantity of water which is sufficient to cause essentially spherical pellets to form is from about 17 to about 20 percent by weight of the initial starting ceramic ingredients and usually between about 18 and about 20 percent by weight of the initial ceramic powder. The total mixing time usually is from about 2 to about 6 minutes.

After the clay mixture is added to the mixer, the table is rotated at from about 10 to about 60 rpm and, preferably, from about 20 to about 40 rpm, and the impacting impeller is rotated to obtain a tip speed of from about 25 to about 50, preferably, from about 25 to about 35, meters per second, and sufficient water is added to cause essentially spherical pellets of the desired size to form. If desired, the impeller may be initially rotated at a lower tip speed of from about 5 to about 20 meters per second during addition of the first half of the sufficient water and subsequently rotated at the higher tip speed of 25 to about 50 meters per second during the addition of the balance of the water. The rate of water addition is not critical. The intense mixing action quickly disperses the water throughout the particles.

4. The resulting pellets are dried at a temperature well below sintering temperature until less than 10 percent, preferably less than 3 percent and, most preferably, less than 1 percent free moisture remains in the pellets. Drying is preferably done in a rotary kiln with flowing gas at a temperature of between about 100 (212° F.) and about 300° C. (572° F.). The most preferred drying gas temperature is between about 175° (347° F.) and 275° C. (527° F.), and the drying time required is usually between about 30 and about 60 minutes. The pellets themselves are generally at a lower temperature than that of the heated gas used to dry them.

5. The dried pellets are then furnaced at sintering temperature for a period sufficient to enable recovery of sintered, spherical pellets having an apparent specific gravity of between 2.70 and 3.30 and a bulk density of from about 1.35 to about 1.80 grams per cubic centimeter. The specific time and temperature to be employed is, of course, dependent on the ingredients employed and the optimum time and temperature for a given starting composition is determined empirically according to the results of physical testing of the resulting pellets after furnacing.

The furnacing step is carried out to sinter the composite pellets; generally, temperatures of between about 1,300° C. (2,372° F.) and about 1,500° C. (2,732° F.) for about 4 to about 20 minutes and, more preferably, from about 1,375° (2,498° F.) to about 1,435° C. (2,606° F.) for about 4 to about 8 minutes, are useful, depending upon the sintering aids and fluxes which may be included or naturally present in the ingredients.

While the process just described hereinabove will yield pellets according to the invention, it is preferred that from about 5 to about 15 percent and, preferably, from about 8 to about 10 percent of additional starting ingredients by weight of pellets be added, after the addition of water but prior to drying of the pellets. The added material is usually but not necessarily of the same composition as that described in step 1. For example, the added material may be pure calcined bauxite or alumina when starting ingredients include uncalcined or partially calcined bauxites and/or clays; thus the composition of the pellets may vary with radius. The addition of more dry ceramic powder is followed by rotating the impeller at a tip speed of between about 5 and about 20 meters per second, preferably, between about 10 and about 20 meters per second, for from about 1 to about 6 minutes, while continuing to rotate the table at from about 10 to about 60 rpm and, preferably, from about 20 to about 40 rpm. This step improves yield and results in improved sphericity of the pellets.

If desired, the rotation of the impeller may then be stopped while the table continues to rotate for between about 1 and about 5 minutes.

The impacting impeller is preferably a disk provided with peripheral rods or bars attached to the disk. The longitudinal axis of the rods or bars is desirably essentially parallel with the axis of rotation of the impeller, which is usually a vertical axis. The diameter of the impeller is measured from the axis of rotation to the center of the most distant rod or bar. Tip speed is the speed of the most distant rod or bar.

The diameter of the impeller depends upon the size of the mixer but is usually slightly less than 25 percent of the diameter of the mixer. The impeller in most applications is between 10 and 100 centimeters in diameter and usually rotates at from 200 to 3,750 rpm at the lower tip speeds of 10 to 20 meters per second, depending upon impeller diameter, and at from 500 to 6,500 rpm at the higher tip speeds of 25 to 35 meters per second, depending upon impeller diameter.

The pellets are screened for size, preferably after drying. However, they may be screened before drying or after furnacing. The rejected oversized and undersized pellets and powdered material obtained after the drying and screening steps may be recycled. The finished pellets may be tumbled to enhance smoothness. The resultant sintered pellets have a bulk density ranging from about 1.35 to about 1.80 grams per cubic centimeter, depending upon the ceramic starting ingredients employed.

The overall particle size of the pellets recommended for use as propping agent for increasing permeability in a subterranean formation penetrated by well is between 0.1 and about 2.5 millimeters and preferably between about 0.15 and 1.7 millimeters.

EXAMPLE 1

The pellets which may be produced according to this example correspond to those identified as Sample No. 1 in Table III. About 81 kilograms of diaspore clay material that had been previously calcined at a temperature sufficiently high to remove any organic materials and substantially all of the water of hydration from the clay, together with about 54 kilograms of bauxite (60 percent by weight calcined clay 40 percent by weight calcined bauxite) powder having an average particle size of between 4 and 8 microns is added to an Eirich mixer having a table diameter of about 115 centimeters, an operating capacity of about 160 kilograms and an impacting impeller diameter of about 27 centimeters.

The table is rotated at about 35 rpm, and the impeller is rotated at about 1,090 rpm, and about 27 kilograms of water is added. Rotation of the table and impeller is continued for about 1 minute; subsequently, the impeller speed is increased to about 2,175 rpm. The table and impeller is rotated until seed pellets are formed, less than 5 percent of which being of a size smaller than 0.50 mm (about 3 minutes). The impeller is then reduced to about 1,090 rpm, and about 4.08 kilograms of the initial diaspore clay-bauxite powder mixture is added. Rotation of the pan and impeller is then continued for an additional 2 minutes to form spherical pellets.

The pellets are then dried for about 20 minutes at about 110° C. (230° F.) in a rotary dryer and then fired at about 1,480° C. (2,696° F.) for about 5 minutes to sinter them. The yield of useful pellets having a size between 150 and 1,700 microns (0.15 and 1.7 millimeters) is typically greater than 80 percent by weight of starting ceramic powder. The resulting pellets have an apparent specific gravity of about 3.27, a bulk density of 1.79 gm/cm$^3$ and a sphericity of greater than 0.7, as determined using the Krumbein and Sloss chart. These pellets are identified as Sample No. 1 in the accompanying Table III.

The pellets identified as Sample Nos. 2-29 in Table III were prepared in a manner comparable to that given in Example I except for the use of different ingredients and proportions and sintering temperatures.

In accompanying Table III is summarized the results of testing for several different pellets according to the invention which were produced from the raw materials in the proportions indicated. Unless otherwise indicated, parts and percentages are by weight. All samples were prepared in accord with the procedures given herein. Example 1 gives in detail the procedure employed in the preparation of Sample No. 1, which procedure is typical of that employed in preparation of the remainder of the samples reported in Table III.

The test procedures and apparatus employed to test the permeability in darcies of the pellets of the present invention included placing a predetermined quantity of the material to be tested between two parallel hardened steel plates, applying force tending to close the initially established 0.125 inch gap between the plates, then measuring the flow rate through the packed cell using distilled water at room temperature at various applied stresses or pressures. The particle size distribution of the pellets was 20×40 mesh, U.S. Standard Sieve (ninety percent by weight minimum of pellets will pass through 20 mesh [841 micron] screen but not through 40 mesh [420 micron] screen).

Values obtained using the American Petroleum Institute (API) procedure for determining resistance to crushing are also reported in Table III. According to this procedure, a bed of about 6 mm depth of sample to be tested is placed in a hollow cylindrical cell. A piston is thereafter inserted in the cell. Thereafter, a load is applied to the sample via the piston. One minute is taken to reach maximum load which is then held for two minutes. The load is thereafter removed, the sample removed from the cell, and screened to separate crushed material. The results are reported as the weight percentage the original sample that crushed. This crushed material is referred to in Table III as "percent fines generated."

Single Pellet Crush is another procedure useful in determining the resistance of pellets to an applied load. In this procedure the pellets of a given sample are first separated into size fractions by sieving. U.S. Standard Sieves were employed for the data reported in Table III. Thereafter, for each size fraction a quantity, e.g. about twenty (20), of the individual pellets are measured and recorded. Each individual pellet is thereafter placed between two flat, hardened parallel plates which are mounted in a press. A load is thereafter applied to the plates. The amount of load required to crush a specific pellet is noted. Results are reported as the arithmetic average value obtained within each size fraction of a given pellet sample for the amount of applied load (pounds force) divided by the diameter-in-inches squared for each of the individual pellets tested (load/diameter squared). The use of ceramic plates is recommended to minimize wear of the testing apparatus.

Carborundum Crush is another procedure for determining the resistance of pellets to an applied load. In this procedure a steel die having a cylindrical cavity of one and one-eighth inch diameter (one square inch area) is filled 10 grams of the pellets to be tested. Thereafter a right cylindrical plunger closely corresponding in diameter to that of the die is inserted into the die and loaded by manually pumping a hydraulic press. The results are reported as the amount of compression (original unloaded pellet column height minus loaded pellet column height) versus applied load. The amount of compression is expressed in thousandths of an inch. The load is expressed in psi.

Acid solubility of the samples reported in Table III was tested in accordance with recommended API test procedure, fourth draft, June 1980. In this procedure a known weight of sample (5 g) is placed in a 150 ml polyethylene beaker containing 100 ml of a combined acid solution containing 12 percent HCl acid and 3 percent HF acid. The sample-and-acid-containing beaker is then placed in a 65.6° C. (150° F.) water bath for 30 to 35 minutes. The sample is not stirred. The sample is thereafter filtered through a previously weighed filter crucible or funnel and washed three times with 20 ml portions of distilled water. The filtered and washed sample is thereafter dried to constant weight (approximately one hour) at 105° C. (220° F.). The values given in Table III represent the percentage of weight lost or dissolved due to the acid.

Sphericity of the pellets reported in Table III was determined using a Krumbein and Sloss chart. The values reported represent an average of 10–20 pellets per sample.

Roundness as reported in Table III is a measure of the relative sharpness of the pellet corners, or of curvature. This evaluation may be done at the same time and on the same sample as that used for sphericity. The pellets are visually compared with a Krumbein and Sloss chart. The values reported represent an average of 10–20 pellets per sample.

Bulk density values reported in Table III were determined by weighing that amount of sample that would fill a cup of known volume.

TABLE III

| COMPOSITION | 1<br>60% Calcined Diaspore Clay<br>40% Calcined Bauxite | 2<br>Sintered Calcined Bauxite | 3<br>4% D.C. Fines<br>76% Calcined Clay<br>20% Calcined Bauxite | 4<br>8% D.C. Fines<br>72% Calcined Clay<br>20% Calcined Bauxite | 5<br>60% Calcined Clay<br>10% Dust Collector Fines 30% Calcined Bauxite | 6<br>50% Calcined Clay<br>10% Dust Collector Fines 40% Calcined Bauxite | 7<br>70% Dust Collector Fines<br>30% Calcined Bauxite | 8<br>Control Batch<br>(Refer to Table I) | | |
|---|---|---|---|---|---|---|---|---|---|---|
| SINTERING TEMP. (C.°) | 1480 | 1495 | 1435 | 1410 | 1480 | 1480 | 1400–1500 | 1465 | 1480 | 1495 | 1510 |
| ROUNDNESS | 0.86 | 0.82 | — | 0.78 | 0.78 | 0.81 | Repeat Samples | | | | |
| SPHERICITY | 0.85 | 0.87 | — | 0.79 | 0.80 | 0.81 | Failed Initial | | | | |
| ACID SOLUBILITY (12-3) | 5.42 | 1.60 | 7.09 | 6.92 | 6.33 | 5.11 | Strength Qualification Tests | | | | 3.89 |
| BULK DENSITY | | | | | | | Very Poor Product | | | | |
| (g/cc) | 1.79 | 2.05 | 1.62 | 1.64 | 1.71 | 1.67 | | | | | |
| (pcf) | 112 | 128 | 101 | 102 | 107 | 104.00 | | | | | |
| ASG (g/cc) | 3.27 | 3.58 | 3.05 | 3.02 | 3.05 | 3.02 | | 3.20 | 3.22 | 3.22 | 3.22 |
| API CRUSH (% weight of fines generated) | | | | | | | | | | | |
| (7500 psi) | — | — | — | — | — | — | | | | | |
| (10000 psi) | 9.9 | 3.8 | 8.4 | 7.50 | 7.42 | 7.19 | | 7.00 | 6.02 | 4.69 | 5.26 |
| SINGLE PELLET CRUSH | | | | | | | | | | | |
| (−16/+20) | — | 26542 | 25974 | 22852 | — | 23427 | | | | | |
| (−20/+25) | 30903 | 28990 | 22481 | 25415 | — | 24158 | | | | | |
| (−25/+30) | 31021 | — | 27985 | 28757 | — | 27365 | | | | | |
| (−30/+35) | 34011 | 34250 | 30319 | 30604 | — | 28703 | | | | | |
| (−35/+40) | 30827 | 33378 | — | 34717 | — | 30599 | | | | | |
| PERMEABILITY (Darcies) at Applied Pressure (psi) | | | | | | | | | | | |
| 2000 | 225 | 229 | | 214 | 235 | | | | | | |
| 4000 | 192 | 208 | | 194 | 210 | | | | | | |
| 6000 | 162 | 188 | | 166 | 180 | | | | | | |
| 8000 | 136 | 165 | | 135 | 140 | | | | | | |
| 10000 | 110 | 144 | | 99 | 104 | | | | | | |
| 12000 | 86 | 123 | | 76 | 82 | | | | | | |
| 14000 | 64 | 102 | | 62 | 66 | | | | | | |

| SAMPLE NO. | 9 | 10 | 11 | 12 | 13 | 14 | 15 |
|---|---|---|---|---|---|---|---|
| | | % Dust Collector | 5% Uncalcined Clay Addition (1982) | 5% Uncalcined Clay Addition (1982) | 5% Uncalcined Clay Addition (1982) | 5% Uncalcined Clay Addition (16 Mesh) | 5% Uncalcined Clay Addition (16 Mesh) |
| CARBO CRUSH (force applied in lbs × 1000 to induce specified deflection) | | | | | | | |
| 0.010 inch | | | | 1.4 | 1.8 | 2.0 | 2.0 |
| 0.020 inch | | | | 2.8 | 4.0 | 4.8 | 4.0 |
| 0.030 inch | | | | 6.6 | 9.0 | 9.8 | 8.4 |
| 0.040 inch | | | | 10.4 | 14.2 | 14.6 | 14.6 |
| 0.050 inch | | | | 14.2 | 18.4 | 18.6 | 18.0 |
| 0.060 inch | | | | 18.0 | 23.2 | 23.6 | 21.6 |
| 0.070 inch | | | | 21.0 | 24.0 | 24.0 | 23.4 |

TABLE III-continued

| COMPOSITION | Control Batch (Refer to Table I) | | | Fines Remainder Control Batch Material | | | Stockpile Remainder Control Batch Material | | | Stockpile Remainder control Batch Material | | | Stockpile Remainder Control Batch Material | | | and Finer) Remainder Control Batch Material | | |
|---|---|---|---|---|---|---|---|---|---|---|---|---|---|---|---|---|---|---|
| SINTERING TEMP.(C.°) | 1465 | 1480 | 1495 | 1510 | 1480 | 1495 | 1510 | 1465 | 1485 | 1495 | 1510 | 1465 | 1485 | 1495 | 1510 | 1465 | 1480 | 1495 |
| ROUNDNESS | | | | | | | | | | | | | | | | | | |
| SPHERICITY | | | | | | | | | | | | | | | | | | |
| ACID SOLUBILITY (12-3) | | | | | | | | | | | | | | | | | | |
| BULK DENSITY | | | | | | | | | | | | | | | | | | |
| (g/cc) | | | | | | | | | | | | | | | | | | |
| (pcf) | | | | | | | | | | | | | | | | | | |
| ASG (g/cc) | 3.20 | 3.21 | 3.21 | 3.21 | 3.10 | 3.09 | 3.10 | 3.14 | 3.12 | 3.12 | 3.13 | 3.14 | 3.13 | 3.12 | 3.13 | 3.15 | 3.13 | 3.13 | 3.14 |
| API CRUSH (% weight of fines generated) | | | | | | | | | | | | | | | | | | |
| (7500 psi) | 7.90 | 6.06 | 3.96 | 4.25 | 7.45 | 6.77 | 5.98 | 10.32 | 9.86 | 8.34 | 7.34 | 8.43 | 7.01 | 6.75 | 6.50 | 10.7 | | | |
| (10000 psi) | | | | | | | | | | | | | | 7.16 | 6.85 | 6.34 | 10.1 | 8.35 | 8.49 | 11.8 | 9.86 | 9.95 |
| SINGLE PELLET CRUSH | | | | | | | | | | | | | | | | | | |
| (−16/+20) | | | | | | | | | | | | | | | | | | |
| (−20/+25) | | | | | | | | | | | | | | | | | | |
| (−25/+30) | | | | | | | | | | | | | | | | | | |
| (−30/+35) | | | | | | | | | | | | | | | | | | |
| (−35/+40) | | | | | | | | | | | | | | | | | | |
| PERMEABILITY (Darcies) at Applied Pressure (psi) | | | | | | | | | | | | | | | | | | |
| 2000 | | | | | | | | | | | | | | | | | | |
| 4000 | | | | | | | | | | | | | | | | | | |
| 6000 | | | | | | | | | | | | | | | | | | |
| 8000 | | | | | | | | | | | | | | | | | | |
| 10000 | | | | | | | | | | | | | | | | | | |
| 12000 | | | | | | | | | | | | | | | | | | |
| 14000 | | | | | | | | | | | | | | | | | | |
| CARBO CRUSH (force applied in lbs × 1000 to induce specified deflection) | | | | | | | | | | | | | | | | | | |
| 0.010 inch | 1.4 | 2.0 | 2.2 | 2.0 | 2.0 | 2.0 | 2.4 | 1.6 | 2.0 | 2.0 | 2.2 | 2.0 | 2.4 | 2.6 | 2.6 | 2.4 | 2.2 | 2.2 | 2.4 | 2.0 | 2.0 | 2.0 |
| 0.020 inch | 2.8 | 4.2 | 5.0 | 5.0 | 4.6 | 5.0 | 6.2 | 4.2 | 4.6 | 5.6 | 6.2 | 5.5 | 6.4 | 5.6 | 5.8 | 6.0 | 5.2 | 5.4 | 5.0 | 5.0 | 4.4 | 4.6 |
| 0.030 inch | 6.6 | 9.6 | 10.2 | 9.6 | 10.2 | 10.8 | 11.2 | 8.0 | 8.6 | 9.4 | 10.2 | 8.0 | 10.4 | 10.4 | 10.4 | 10.0 | 9.2 | 9.0 | 9.0 | 8.0 | 7.4 | 8.0 |
| 0.040 inch | 10.4 | 14.2 | 15.2 | 14.8 | 14.0 | 14.8 | 15.6 | 11.6 | 12.4 | 13.0 | 13.8 | 11.6 | 13.8 | 14.0 | 14.2 | 14.0 | 12.7 | 14.0 | 16.8 | 10.6 | 10.2 | 10.6 |
| 0.050 inch | 14.2 | 18.6 | 19.0 | 18.4 | 17.8 | 18.4 | 20.0 | 19.6 | 16.8 | 18.6 | 17.2 | 14.6 | 17.6 | 18.6 | 18.6 | 17.6 | 15.8 | 17.6 | 16.0 | 13.0 | 12.6 | 12.8 |
| 0.060 inch | 18.0 | 23.6 | 24+ | 22.8 | 20.8 | 22.4 | 24.0+ | 17.4 | 18.2 | 19.2 | 20.2 | 18.0 | 20.8 | 22.8 | 22.6 | 21.8 | 18.4 | 21.8 | 19.2 | 15.0 | 15.0 | 15.4 |
| 0.070 inch | 21.0 | 24+ | — | 24+ | 22.8 | 24.0+ | — | 20.4 | 21.6 | 22.0 | 23.0 | 21.8 | 23.2 | 24+ | 24+ | 24+ | 22.8 | 24+ | 22.8 | 19.0 | 19.2 | 19.8 |

SAMPLE NO.

| 16 | 17 | 18 | 19 | 20 | 21 | 22 |
|---|---|---|---|---|---|---|
| 10% Uncalcined Clay Addition (1982 Stockpile) Remainder control | 15% Uncalcined Clay Addition (1982 Stockpile) Remainder Control | 20% Uncalcined Clay Addition (1982 Stockpile) Remainder Control | 30% Uncalcined Clay Addition (1982 Stockpile) Remainder of the Control Batch | 40% Uncalcined Clay Addition (1982 Stockpile) 60% Calcined | 50% Uncalcined Clay (Stockpile #1) 50% Calcined | 50% Uncalcined Clay (Stockpile #1) 50% Calcined |

TABLE III-continued

| COMPOSITION | Batch Material | Batch Material | | | | Batch Material | | | | Batch Material | | | | Material | | | Bauxite | | | | Bauxite | | | Bauxite | | |
|---|---|---|---|---|---|---|---|---|---|---|---|---|---|---|---|---|---|---|---|---|---|---|---|---|---|---|
| SINTERING TEMP. (C.°) | 1495 | 1465 | 1480 | 1495 | 1510 | 1465 | 1480 | 1495 | 1510 | 1465 | 1480 | 1495 | 1510 | 1480 | 1495 | 1510 | 1450 | 1465 | 1480 | 1495 | 1450 | 1465 | 1480 | 1450 | 1465 | 1480 |
| ROUNDNESS | | | | | | | | | | | | | | | | | | | | | | | | | | |
| SPHERICITY | | | | | | | | | | | | | | | | | | | | | | | | | | |
| ACID SOLUBILITY (12-3) | | | | | | | | | | | | | | | | | | 4.35 | | | | | | | | |
| BULK DENSITY | | | | | | | | | | | | | | | | | | | | | | | | | | |
| (g/cc) | | | | | | | | | | | | | | | | | | | | | | | | | | |
| (pcf) | | | | | | | | | | | | | | | | | | | | | | | | | | |
| ASG (g/cc) | 3.11 | 3.09 | 3.08 | 3.09 | 3.09 | 3.08 | 3.04 | 3.04 | 3.04 | 3.09 | 3.08 | 3.04 | 2.98 | 2.99 | 2.97 | | 3.11 | 3.09 | 3.09 | 3.09 | 3.17 | 3.17 | 3.15 | 3.13 | 3.11 | 3.09 |
| API CRUSH (% weight of fines generated) | | | | | | | | | | | | | | | | | | | | | | | | | | |
| (7500 psi) | | | | | | | | | | | | | | | | | | | | | | | | | | |
| (10000 psi) | | | | | | | | | | | | | | | | | | | | | | | | | | |
| (1000 psi) | 7.88 | 8.26 | 7.59 | 6.72 | 10.12 | 8.76 | 7.83 | 7.56 | 11.98 | 8.61 | 8.50 | 9.04 | | | | | 6.72 | 7.00 | 8.26 | 8.78 | 9.65 | 8.20 | 7.45 | 10.52 | 7.60 | |
| SINGLE PELLET CRUSH | | | | | | | | | | | | | | | | | | | | | | | | | | |
| (−16/+20) | | | | | | | | | | | | | | | | | | | | | | | | | | |
| (−20/+25) | 9.55 | | | | | | | | | | | | | | | | | | | | | | | | | |
| (−25/+30) | | | | | | | | | | | | | | | | | | | | | | | | | | |
| (−30/+35) | | | | | | | | | | | | | | | | | | | | | | | | | | |
| (−35/+40) | | | | | | | | | | | | | | | | | | | | | | | | | | |
| PERMEABILITY (Darcies) at Applied Pressure (psi) | | | | | | | | | | | | | | | | | | | | | | | | | | |
| 2000 | | | | | | | | | | | | | | | | | | | | | | | | | | |
| 4000 | | | | | | | | | | | | | | | | | | | | | | | | | | |
| 6000 | | | | | | | | | | | | | | | | | | | | | | | | | | |
| 8000 | | | | | | | | | | | | | | | | | | | | | | | | | | |
| 10000 | | | | | | | | | | | | | | | | | | | | | | | | | | |
| 12000 | | | | | | | | | | | | | | | | | | | | | | | | | | |
| 14000 | | | | | | | | | | | | | | | | | | | | | | | | | | |
| CARBO CRUSH (force applied in lbs × 1000 to induce specified deflection) | | | | | | | | | | | | | | | | | | | | | | | | | | |
| 0.010 inch | 1.6 | 1.8 | 2.0 | 2.0 | 2.0 | 1.8 | 2.2 | 4.0 | 5.0 | 3.2 | | | | | | | 2.6 | 2.2 | | | | | | 3.3 | 3.1 | |
| 0.020 inch | 4.0 | 3.8 | 5.0 | 5.0 | 5.2 | 3.4 | 5.0 | 8.0 | 10.0 | 7.0 | 4.0 | 4.0 | | | | | 5.6 | 4.8 | | | | | | 6.1 | 5.8 | |
| 0.030 inch | 7.4 | 8.0 | 10.0 | 10.2 | 10.2 | 8.0 | 10.2 | 11.0 | 14.0 | 10.0 | 8.2 | 8.0 | | | | | 11.2 | 10.0 | | | | | | 8.8 | 8.4 | |
| 0.040 inch | 10.4 | 11.0 | 13.2 | 13.6 | 14.6 | 11.4 | 13.2 | 14.0 | 17.2 | 12.6 | 11.1 | 11.0 | | | | | 14.6 | 13.0 | | | | | | 11.7 | 10.4 | |
| 0.050 inch | 14.8 | 14.4 | 17.0 | 17.4 | 19.0 | 13.8 | 17.0 | 16.2 | 20.6 | 14.6 | 13.8 | 14.0 | | | | | 17.8 | 17.4 | | | | | | 14.9 | 13.9 | |
| 0.060 inch | 17.8 | 17.0 | 20.0 | 21.0 | 22.8 | 17.4 | 19.6 | 20.6 | 23.0 | 16.6 | 16.2 | 16.4 | | | | | 21.2 | 19.4 | | | | | | 18.6 | 16.9 | |
| 0.070 inch | 21.8 | 20.6 | 24+ | 24+ | 24+ | 20.6 | 23.2 | 23.2 | 24+ | 20.6 | 20.6 | 20.0 | | | | | 24+ | 22.8 | | | | | | 21.7 | 19.8 | |

| COMPOSITION | 23<br>50% Uncalcined Clay<br>(Stockpile #1)<br>50% Calcined<br>Bauxite | | | 24<br>60% Uncalcined Clay<br>(Stockpile #1)<br>40% Calcined<br>Bauxite | 25<br>60% Uncalcined Clay<br>(Stockpile #1)<br>40% Calcined<br>Bauxite | | | | 26<br>70% Uncalcined Clay<br>(Stockpile #1)<br>30% Calcined<br>Bauxite | | |
|---|---|---|---|---|---|---|---|---|---|---|---|
| SINTERING TEMP.(C.°) | 1440 | 1450 | 1465 | 1450 | 1350 | 1370 | 1400 | 1450 | 1440 | 1450 | 1460 |

SAMPLE NO.

TABLE III-continued

| | | | | | | | | | | | | | |
|---|---|---|---|---|---|---|---|---|---|---|---|---|---|
| ROUNDNESS | | | | | | | | | | | | | |
| SPHERICITY | | | | | | | | | | | | | |
| ACID SOLUBILITY (12-3) | | | | | | | | | | | | | |
| BULK DENSITY | | | | | | | | | | | | | |
| (g/cc) | | | | | | | | | | | 1.52 | 1.59 | 1.66 | 1.75 |
| (pcf) | | | | | | | | | | | | | | |
| ASG (g/cc) | 3.14 | 3.13 | 3.11 | 3.00 | 3.00 | | 2.82 | 2.88 | 3.06 | 3.08 | | 2.92 | 2.93 | 2.80 |
| API CRUSH (% weight of fines generated) | | | | | | | | | | | | | | |
| (7500 psi) | | | | | | | | | | | | | | |
| (10000 psi) | 8.98 | 7.41 | 6.90 | 12.14 | 14.21 | 15.32 | 12.4 | 8.70 | 9.29 | 11.78 | 11.58 | | | 14.71 |
| SINGLE PELLET CRUSH (1000 psi) | | | | | | | | | | | | | | |
| (−16/+20) | | | | | | | | | | | | | | |
| (−20/+25) | | | | | | | | | | | | | | |
| (−25/+30) | | | | | | | | | | | | | | |
| (−30/+35) | | | | | | | | | | | | | | |
| (−35/+40) | | | | | | | | | | | | | | |
| PERMEABILITY (Darcies) at Applied Pressure (psi) | | | | | | | | | | | | | | |
| 2000 | | | | 260 | | 249 | | | | | | | | |
| 4000 | | | | 224 | | 219 | | | | | | | | |
| 6000 | | | | 189 | | 189 | | | | | | | | |
| 8000 | | | | 153 | | 159 | | | | | | | | |
| 10000 | | | | 117.3 | | 130 | | | | | | | | |
| 12000 | | | | 81.5 | | 100 | | | | | | | | |
| 14000 | | | | 45.7 | | 70 | | | | | | | | |
| CARBO CRUSH (force applied in lbs × 1000 to induce specified deflection) | | | | | | | | | | | | | | |
| 0.010 inch | | | | 2.7 | 2.3 | | | | | | | | | |
| 0.020 inch | | | | 5.3 | 4.7 | | | | | | | | | |
| 0.030 inch | | | | 7.4 | 6.5 | | | | | | | | | |
| 0.040 inch | | | | 9.6 | 8.9 | | | | | | | | | |
| 0.050 inch | | | | 12.2 | 11.3 | | | | | | | | | |
| 0.060 inch | | | | 14.8 | 7.4 | | | | | | | | | |
| 0.070 inch | | | | 17.9 | 17.0 | | | | | | | | | |

Referring to Table III, Sample Nos. 1 and 2 may be used as baselines for comparison with pellets prepared according to the invention. Sample No. 1 was prepared from 60 percent calcined diaspore clay and 40 percent calcined bauxite and is considered to be an intermediate strength product suitable for use in wells down to a depth of about 14,000 feet, which corresponds to pressures of about 700 kg/cm$^2$ (10,000 psi). Sample 2 was prepared from calcined bauxite and is considered to be a premium high strength product suitable for use in wells of a depth exceeding 14,000 feet. Sample No. 2 is the standard against which other products including other standards such as Sample No. 1 are compared.

Samples Nos. 8 and 9 were prepared from a control batch of calcined clay and bauxite ingredients having the analysis indicated in Table 1. The control batch material is standard employed to assure that processing conditions are being maintained. The chemical composition of the control batch is similar to that of Sample No. 1, Table III.

Samples Nos. 3-7 and 10-26 of Table III were prepared utilizing at least one uncalcined or partially calcined ingredient.

The data given in Table III with respect to Sample Nos. 3, 4, 5, 6, 10 when compared with Sample No. 1 supports a conclusion that Sample Nos. 3, 4, 5, 6, 10 made from ingredients, including dust collector fines, are suitable as intermediate strength proppants. It is notable that the apparent specific gravity of Sample Nos. 3-6 and 10 are lower than that of Control Sample Nos. 1 and 8-9, yet the resistance-to-crushing as directly indicated by any of the crush resistance test results or indirectly indicated by the permeability test results of Sample Nos. 3-6 and 10 are comparable to that of the controls.

Sample No. 7 was prepared using 70 percent dust collector fines. This product was unsatisfactory and crushed easily.

Samples Nos. 11-15 were each prepared from the same ratio and type of ingredients (5 percent uncalcined clay, remainder control batch). These samples demonstrate the variations in product characteristics that can be expected. These samples are within the invention and are deemed suitable for use as intermediate strength proppants. These samples also exhibit lower apparent specific gravities than control samples 1 and 8-9.

Sample Nos. 11-25 were prepared from using different amounts and sources of uncalcined clay. Each of these samples is deemed suitable for use as proppants.

Generally speaking, as the amount of uncalcined clay is increased, the apparent specific gravity of the resulting pellets is reduced and effective sintering may be done at a lower temperature. Sample No. 26 is deemed marginally suitable due to its high level of fines generated on API Crush.

A comparison of the test results for Samples Nos. 1 and 5 indicates that substitution of 10 percent dust collector fines for calcined bauxite when the remaining ingredient is clay actually improves characteristics of the pellets that are considered significant for proppants. Note that Sample 5 exhibited lower apparent specific gravity, lower percent fines generated on API Crush and greater permeability than Sample No. 1. The permeability of Sample Nos. 1 and 5 was comparable. This is surprising. It was previously thought that the use of a higher amount of silica and material having a high LOI (due to substitution of dust collector fines for calcined bauxite) would result in a lower performance product due to the lower amount of alumina and greater amount of closed porosity as evidenced by lower apparent specific gravity. It was thought that use of a material having a high LOI (e.g. greater than 1-2 percent) would damage the structure as the chemically bound water and volatiles are driven off during furnacing of the pellets.

Referring now to Sample Nos. 8 and 9 of Table III, it can be seen that sintering temperature has a significant effect on the strength of pellets of a given composition. For Sample Nos. 8 and 9 furnacing the dried pellets at 1495° C. provided greatest resistance to crushing as evidenced by lowest percent lines generated for API Crush and greatest amount of applied load to induce a specified compression. A value of 24+ or lack of an entry following a 24+ entry indicates that the capacity of the press was reached or would have been exceeded for the specified amount of compression.

A comparison of the results given in Table III for Sample Nos. 1 and 25 reveals that use of 60 percent uncalcined clay permits furnacing at lower temperature while yielding a product of lower apparent specific gravity, lower API Crush and greater permeability.

The composite, spherical, sintered pellets of the present invention are useful as a propping agent in methods of fracturing subterranean formations to increase the permeability thereof, particularly those formations having a compaction pressure of at least 280 kg/cm$^2$ (4000 psi), which are typically located at a depth 6,000 feet or greater. Pellets according to the present invention are presently believed to be particularly suitable for use at depths greater than 7,000 feet but less than 14,000 feet.

When used as a propping agent, the pellets of the present invention may be handled in the same manner as other propping agents. The pellets may be delivered to the well site in bags or in bulk form along with the other materials used in fracturing treatment. Conventional equipment and techniques may be used to place the spherical pellets as propping agent.

A viscous fluid, frequently referred to as "pad", is injected into the well at a rate and pressure to initiate and propagate a fracture in the subterranean formation. The fracturing fluid may be an oil base, water base, acid, emulsion, foam, or any other fluid. Injection of the fracturing fluid is continued until a fracture of sufficient geometry is obtained to permit placement of the propping pellets. Thereafter, pellets as hereinbefore described are placed in the fracture by injecting into the fracture a fluid into which the pellets have previously been introduced and suspended. The propping distribution is usually, but not necessarily, a multi-layer pack. The overall particle size of the pellets is between about 0.1 and about 2.5 millimeters and, more preferably, between about 0.15 and about 1.7 millimeters. Following placement of the pellets, the well is shut-in for a time sufficient to permit the pressure in the fracture to bleed off into the formation. This causes the fracture to close and apply pressure on the propping pellets which resist further closure of the fracture.

The foregoing description and embodiments are intended to illustrate the invention without limiting it thereby. It will be understood that various modifications can be made in the invention without departing from the spirit or scope thereof.

We claim:

1. A method of fracturing a subterranean formiation located at a depth in excess of 6,000 but less than 14,000 feet, which comprises injecting a hydraulic fluid into said formation at a rate and pressure sufficient to open a fracture therein, injecting into said fracture a fluid containing composite, sintered, spherical pellets having a permeability to distilled water at about 75° F. (24° C. which decreases not more than about three-fourths when the applied pressure on said pellets is increased from 2,000 to 10,000 psi (140–700 kg/cm²), said pellets being prepared from materials consisting essentially of clay materials, bauxitic materials and alumina wherein said materials include at least one uncalcined or partially calcined ingredient selected from the group consisting of clay materials, bauxitic materials, and dust collector fines produced during the calcination of clay materials or bauxitic materials, and said pellets having an alumina-to-silica dry-weight-basis ratio from about 9:1 to about 1:1, said pellets having an apparent specific gravity of less than 3.30 and at least about 6.51 weight percent of other than alumina and silica.

2. In a hydraulic fracturing method in which a fluid is injected into a subterranean formation to open a fracture therein, said formation being located at a depth in excess of 6,000 but less than 14,000 feet, the improvement wherein the fracture is propped with composite, sintered, spherical pellets having a permeability to distilled water at about 75° F. (24° C.) which decreases not more than about three-fourths when the pressure applied to said pellets is increased from 2,000 to 10,000 psi (140–700 kg/cm²); said pellets being prepared from materials consisting essentially of clay materials, bauxitic materials and alumina which are substantially free of nepheline syenite wherein said materials include at least one uncalcined or partially calcined ingredient selected from the group consisting of clay materials, bauxitic materials, and dust collector fines produced during calcination of clay materials or bauxitic materials, said pellets having an alumina-to-silica dry-weight-basis ratio from about 9:1 to about 1:1, said pellets having an apparent specific gravity of less than 3.30 and at least about 6.51 weight percent of other than alumina and silica.

3. A method for increasing permeability in a subterranean formation penetrated by a well wherein a fluid is pumped into a well to create a fracture in said subterranean formation, the improvement which comprises introducing into a fluid composite, sperical, sintered pellets prepared from a mixture containing at least one uncalcined or partially calcined ingredient selected from the group consisting of clay materials, bauxitic materials, and dust collector fines productced during calcination of clay materials or bauxitic materials, said mixture also containing fully calcined clay and/or full calcined bauxite or alumina, said mixture being essentially free of nepheline syenite, said pellets having an apparant specific gravity of less than 3.30; said pellets containing at least 0.651 weight percent of other than alumina plus silica; introducing said pellet-containing fluid into a fracture, the compaction pressure of which is between about 280 and about 700 kg/cm² (4,000 and about 10,000 psi), to deposit a propping distribution of said pellets, said pellets having an average particle size between 0.1 and 2.5 millimeters.

4. the method of claim 1, 2, or 3, wherein said pellets are prepared from a mixture containing at least one uncalcined or partially calcined ingredient selected from the group consisting of clay materials, wherein the clay material is uncalcined or partially calcined diaspore clay, burley clay, flint clay or mixtures therof.

5. The method of claim 1, 2, or 3, wherein said pellets have an average particle size between 0.1 and 2.5 millimeters, wherein said pellets are prepared from a mixture containing uncalcined or partially calcined ingredients and fully calcined ingredients, said mixture containing on a dry weight basis from 20 to 40 percent calcined bauxite, 4 to 10 percent dust collector fines produced during calcination of clay materials and/or bauxitic materials and a remainder of calcined clay, wherein said pellets have an apparent specific gravity between about 2.9 and 3.2.

6. The method of claim 1, 2, or 3 wherein said pellets have an average particle size between 0.1 and 2.5 millimeters, wherein said pellets are prepared from a mixture containing on a dry weight basis from 5 to 30 percent uncalcined clay with the remainder being calcined bauxite and calcined clay, wherein said pellets have an apparent specific gravity between about 2.9 to 3.2.

7. The method of claim 1, 2, 3, wherein said pellets have an average particle size between 0.1 and 2.5 millimeters, wherein said pellets are prepared from a mixture containing on a dry weight basis from about 40 to about 70 percent uncalcined clay and a remainder of calcined bauxite, wherein said pellets have an apparent specific gravity between about 2.9 to 3.2.

8. The method of claim 1, 2 or 3, wherein said pellets have a bulk density between about 1.35 and about 1.80 grams per cubic centimeter.

9. The method fo claim 1 or 2, wherein said pellets are prepared from a mixture.

10. The method of claims 1, 2, or 3, wherein said pellets are prepared from a mixture consisting essentially of clay materials and bauxitic materials.

11. The method of claim 10 wherein said pellets are prepared from a mixture that is free of added fluxes.

* * * * *